United States Patent
Lee

(10) Patent No.: US 11,075,521 B2
(45) Date of Patent: Jul. 27, 2021

(54) ENERGY STORAGE SYSTEM

(71) Applicant: LSIS CO., LTD., Anyang-si (KR)

(72) Inventor: Ji-Heon Lee, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 16/646,826

(22) PCT Filed: May 10, 2018

(86) PCT No.: PCT/KR2018/005380
§ 371 (c)(1),
(2) Date: Mar. 12, 2020

(87) PCT Pub. No.: WO2019/059487
PCT Pub. Date: Mar. 28, 2019

(65) Prior Publication Data
US 2020/0280191 A1 Sep. 3, 2020

(30) Foreign Application Priority Data
Sep. 20, 2017 (KR) .......................... 10-2017-0121234

(51) Int. Cl.
*H02J 3/38* (2006.01)
*G05B 19/042* (2006.01)
*H02J 7/00* (2006.01)

(52) U.S. Cl.
CPC .............. *H02J 3/38* (2013.01); *G05B 19/042* (2013.01); *H02J 7/0068* (2013.01); *G05B 2219/2639* (2013.01)

(58) Field of Classification Search
CPC ............................................ G05B 2219/2639
See application file for complete search history.

(56) References Cited

U.S. PATENT DOCUMENTS 5,946,617 A * 8/1999 Portaro ..................... H04B 7/26
379/413
9,705,321 B1 * 7/2017 Frink ........................ H02J 1/10
(Continued)

FOREIGN PATENT DOCUMENTS

EP 2343788 A2 7/2011
EP 3188343 A1 7/2017
(Continued)

OTHER PUBLICATIONS

"Techopedia explains Rectifier, techopedia.com/definition/681/rectifier" (Year: 2020).*
(Continued)

*Primary Examiner* — Santosh R Poudel
(74) *Attorney, Agent, or Firm* — K&L Gates LLP

(57) ABSTRACT

The present invention relates to an energy storage system. An energy storage system according to an embodiment of the present invention relates to an energy storage system for managing a grid and power of a direct current (DC) power distribution network associated with the grid, the energy storage system comprising: a first converter connected between a grid and the DC power distribution network so as to control voltage of the DC power distribution network; a second converter connected to the DC power distribution network so as to detect voltage of the DC power distribution network; a battery connected to the second converter, wherein the second converter controls charging/discharging of the battery; a rectifier connected in parallel to the first converter; and a first higher layer controller for controlling the first converter, the second converter, and the rectifier, and determining a limit voltage of the DC power distribution network and whether to drive the rectifier, on the basis of a state of the first converter.

13 Claims, 7 Drawing Sheets

(56) References Cited

U.S. PATENT DOCUMENTS

| | | | | |
|---|---|---|---|---|
| 2010/0181837 | A1* | 7/2010 | Seeker | H02J 3/382 |
| | | | | 307/72 |
| 2011/0006607 | A1 | 1/2011 | Kwon et al. | |
| 2012/0187756 | A1* | 7/2012 | Yanagisawa | E02F 9/2075 |
| | | | | 307/9.1 |
| 2014/0008977 | A1* | 1/2014 | Koukkari | B60L 1/20 |
| | | | | 307/23 |
| 2016/0013728 | A1* | 1/2016 | Giuntini | H02J 9/062 |
| | | | | 307/66 |
| 2017/0194791 | A1* | 7/2017 | Budde | H02M 7/44 |
| 2017/0310232 | A1* | 10/2017 | De Hoog | H02J 13/0006 |
| 2018/0331540 | A1* | 11/2018 | Mao | H02J 3/38 |
| 2019/0044340 | A1* | 2/2019 | Jacobson | H02J 3/24 |
| 2019/0363569 | A1* | 11/2019 | Toyoda | H02J 9/06 |

FOREIGN PATENT DOCUMENTS

| | | |
|---|---|---|
| JP | 2011109784 A | 6/2011 |
| KR | 20110072912 A | 6/2011 |
| KR | 20130052362 A | 5/2013 |
| KR | 20130056489 A | 5/2013 |
| KR | 101622511 B1 | 5/2016 |
| KR | 20160097865 A | 8/2016 |

OTHER PUBLICATIONS

"Sourav Gupta, AC to DC Converter Circuit, Feb. 19, 2019, circuitdigest.com/electronic-circuits/ac-to-dc-converter-circuit-diagram" (Year: 2019).*

International Search Report for related International Application No. PCT/KR2018/005380; report dated Mar. 28, 2019; (5 pages).

Written Opinion for related International Application No. PCT/KR2018/005380; report dated Mar. 28, 2019; (3 pages).

Extended European Search Report for related EP Application No. 18857969.2; report dated Oct. 9, 2020—8 Pages.

Japanese Office Action for related Japanese Application No. 2020-515877; report dated Apr. 20, 2021; (2 pages).

* cited by examiner

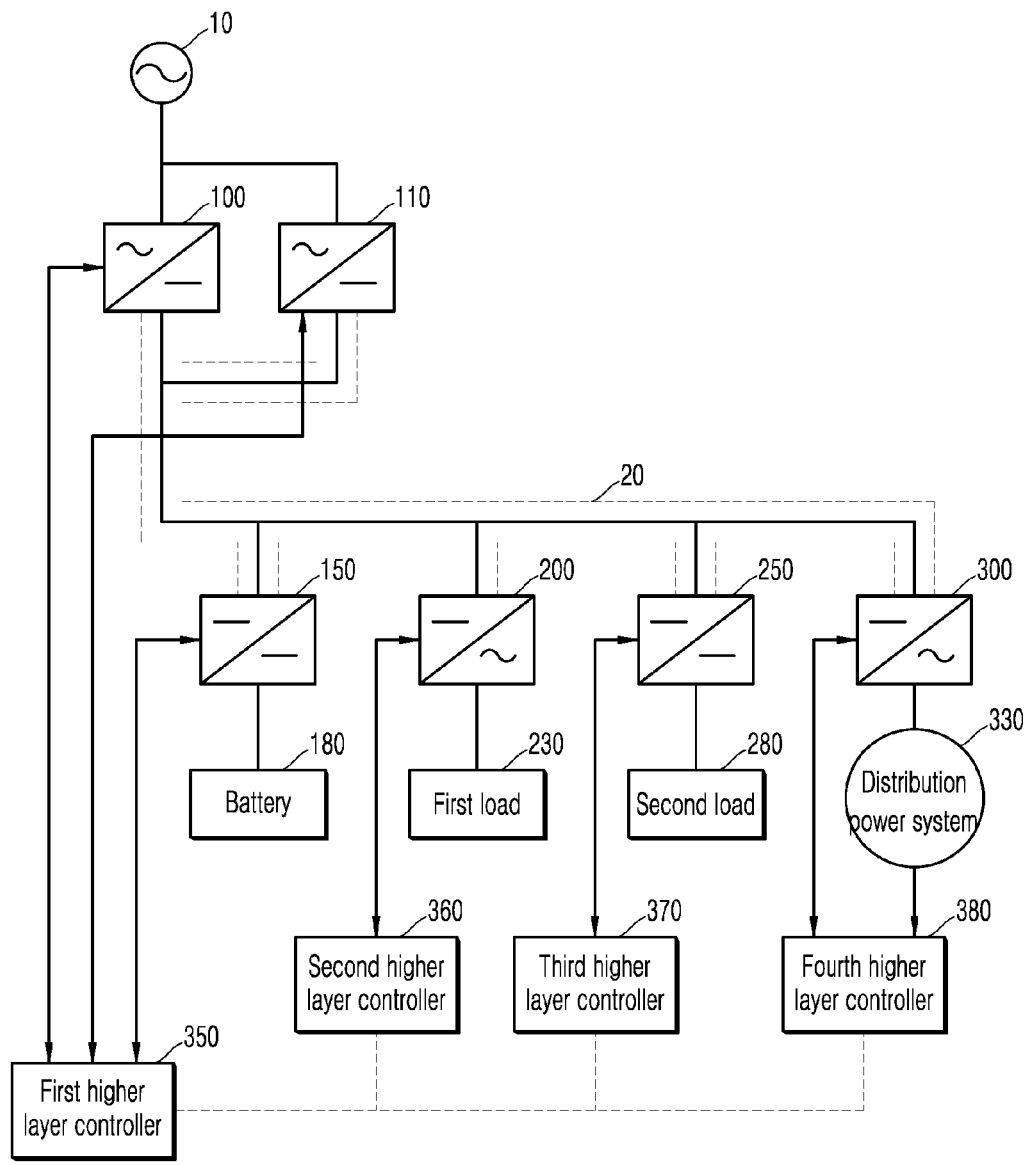
[FIG. 1]

[FIG. 2]
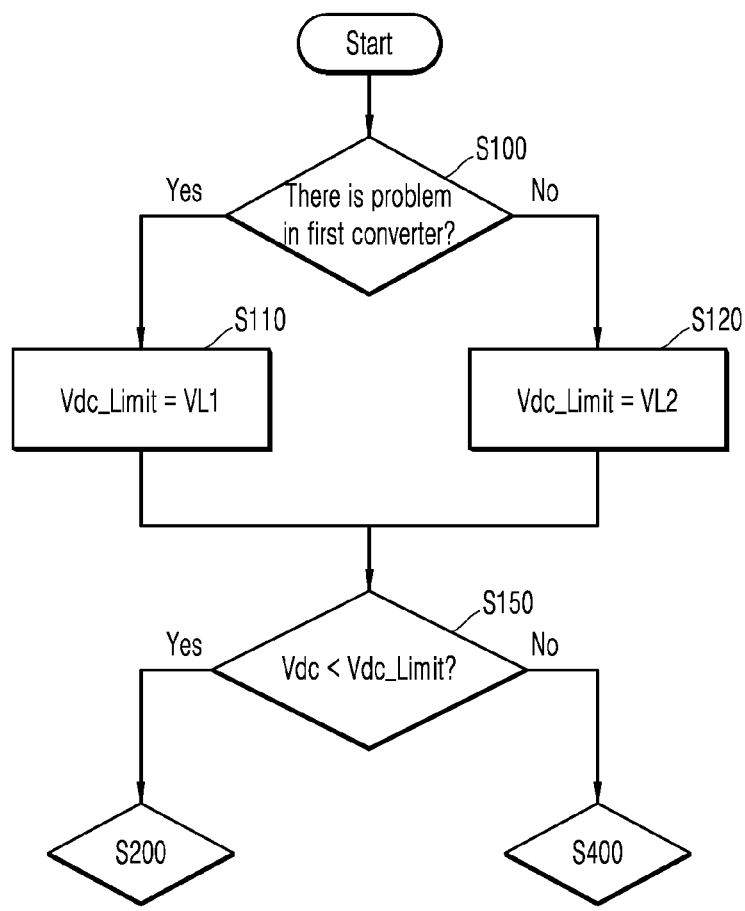

[FIG. 3]
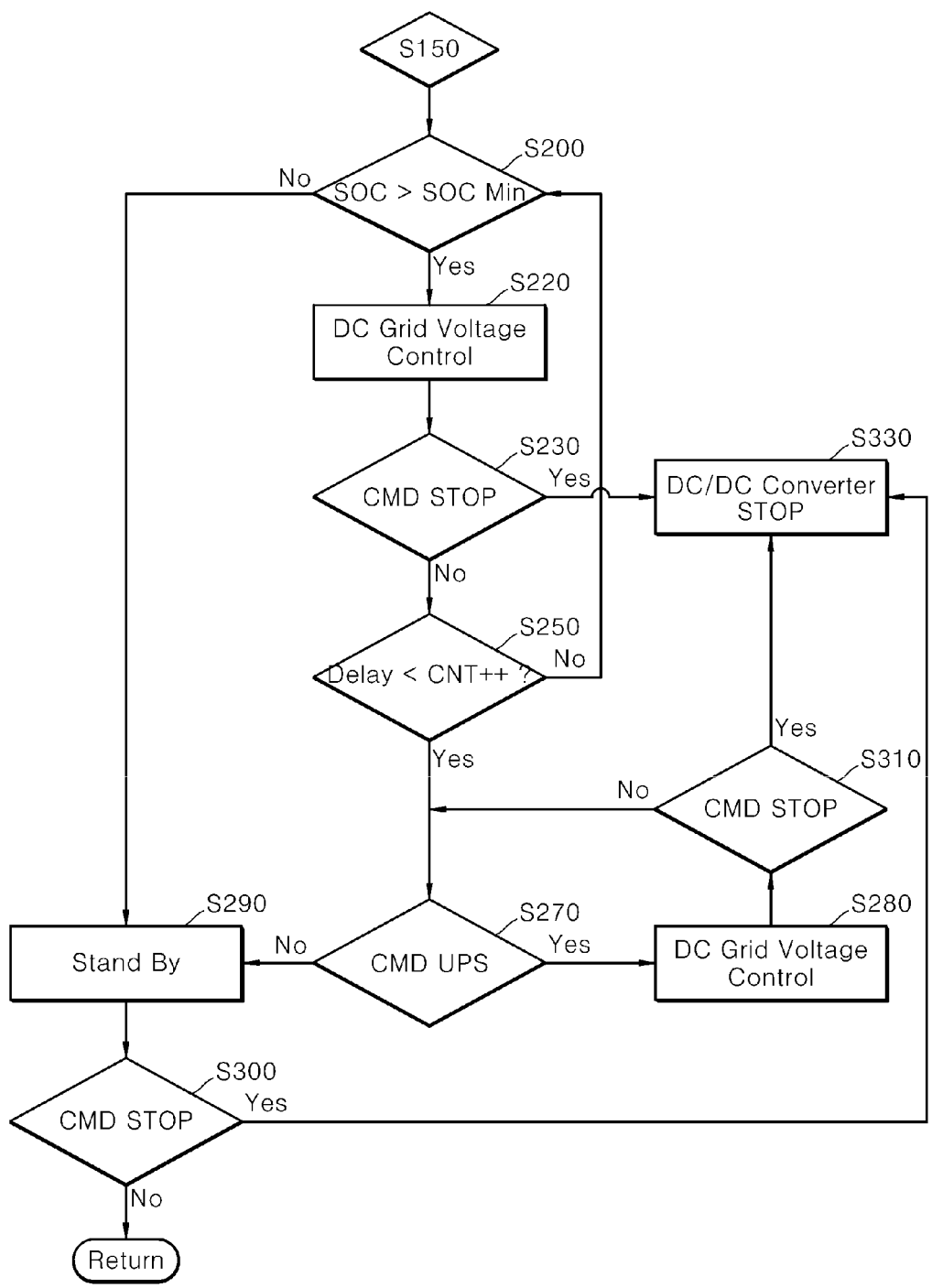

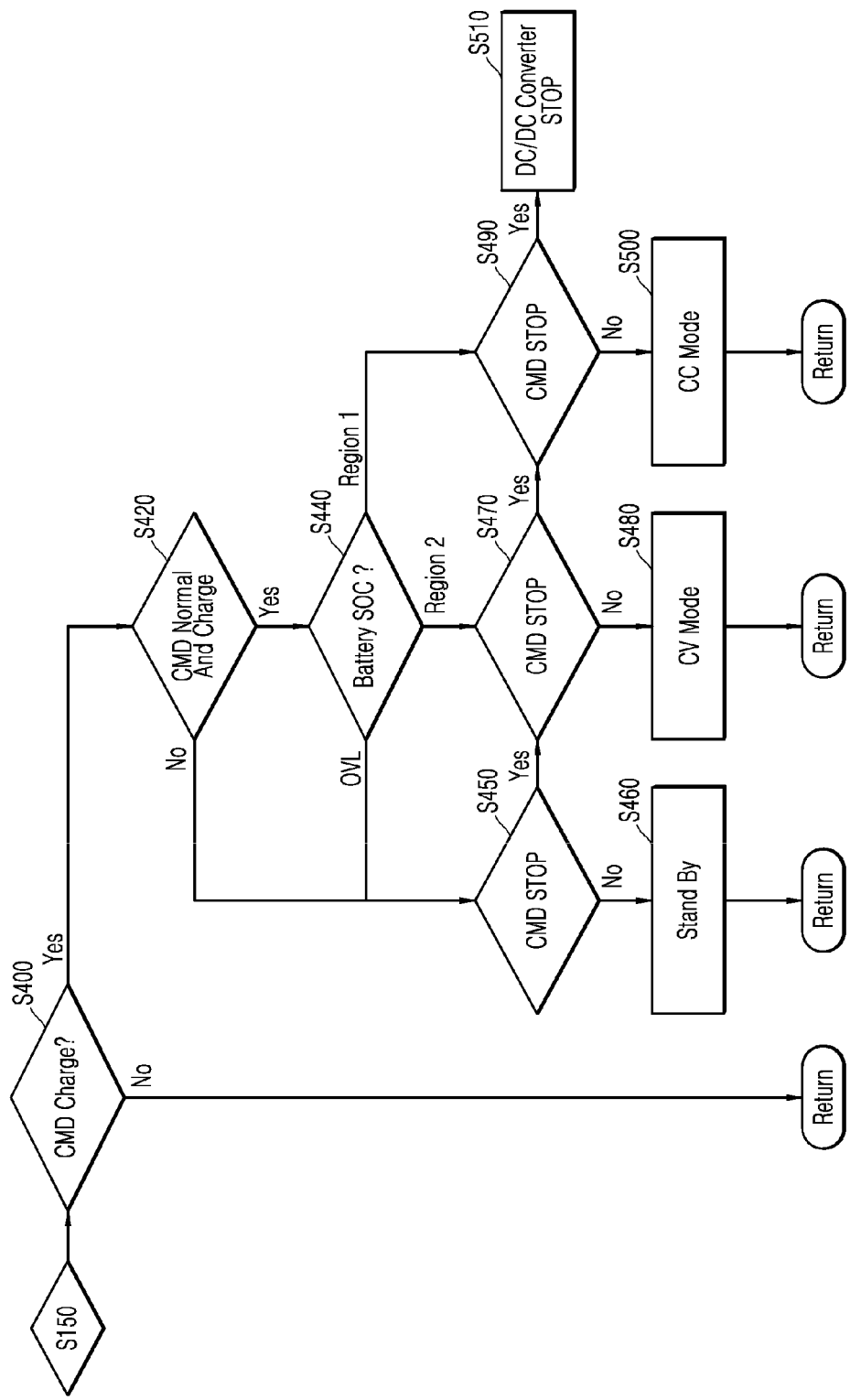
[FIG. 4]

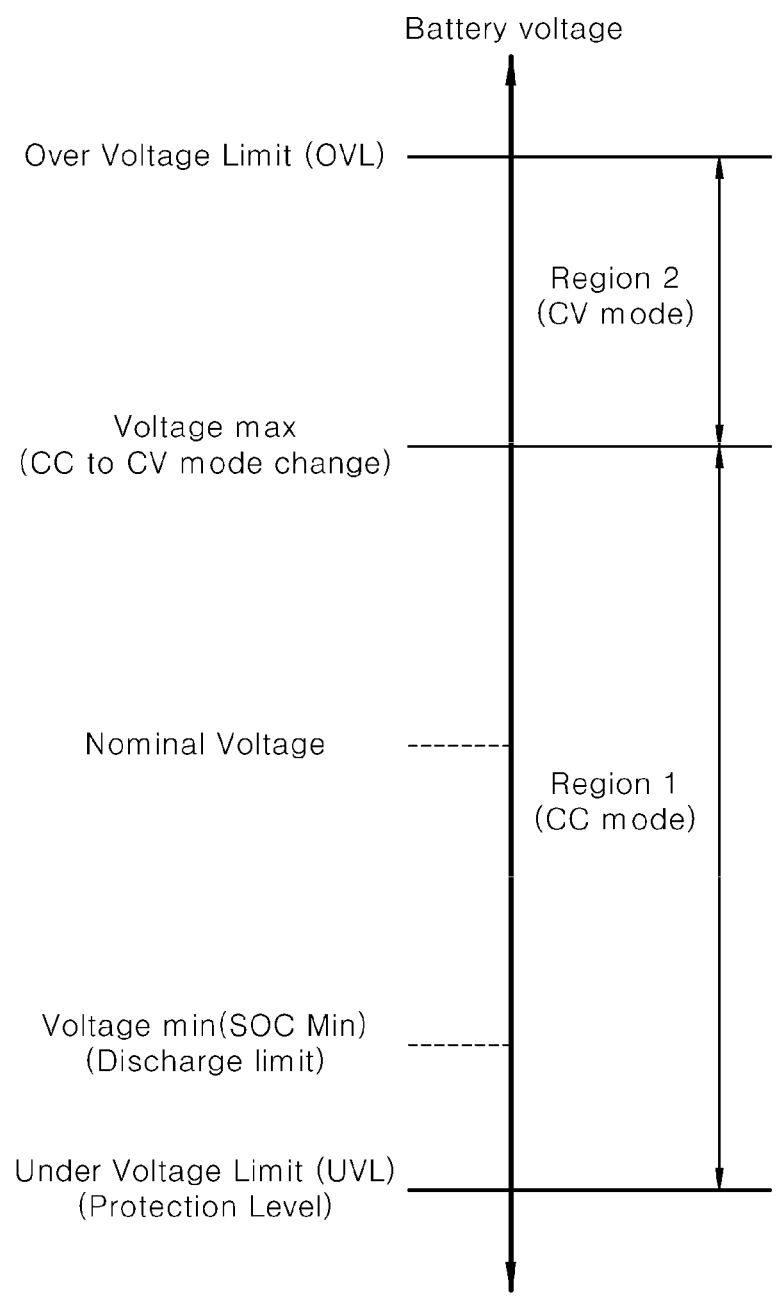

[FIG. 6]
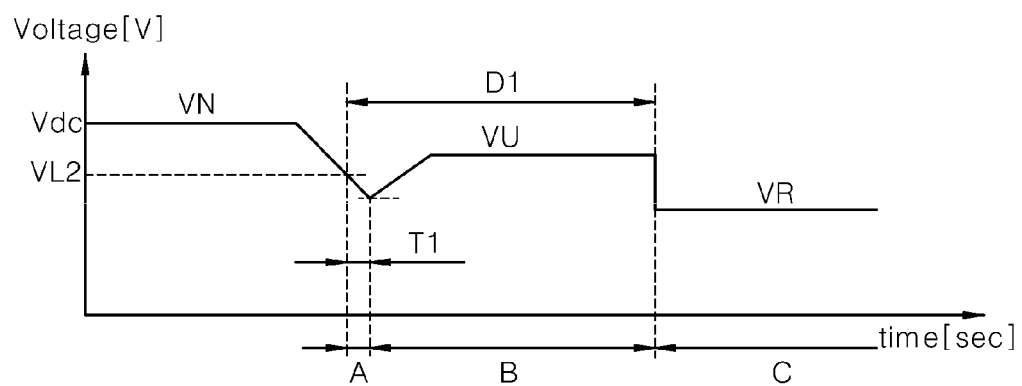
[FIG. 7]
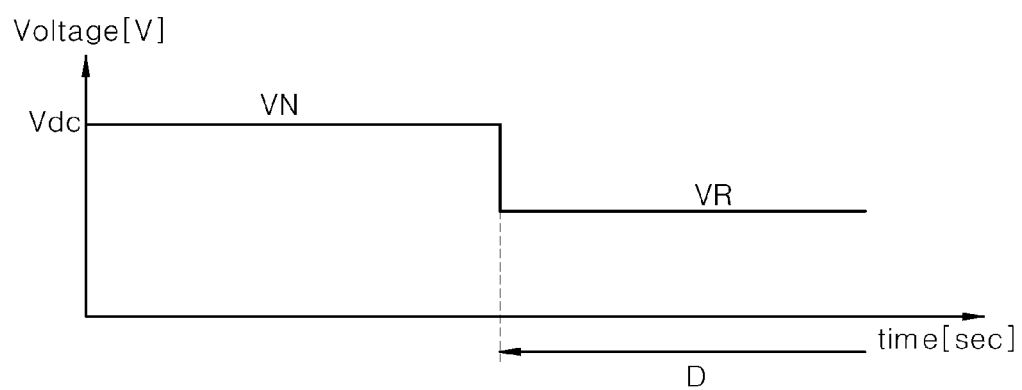

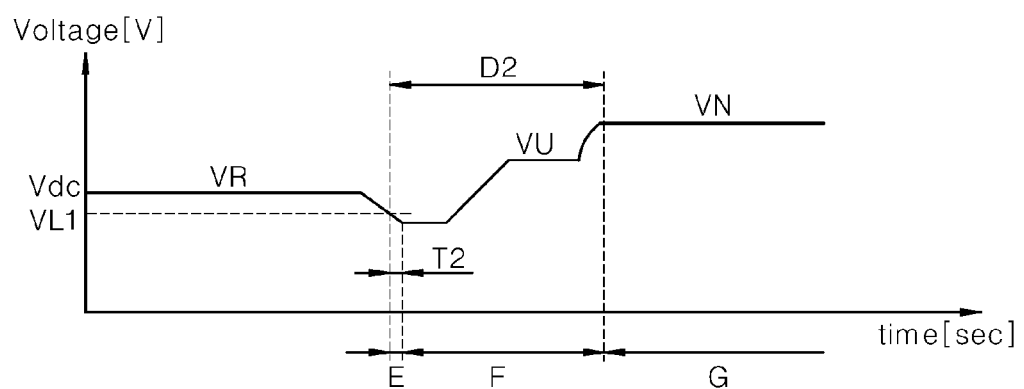
[FIG. 8]

ENERGY STORAGE SYSTEM

CROSS-REFERENCE TO RELATED APPLICATIONS

The present application is a National Stage of International Application No. PCT/KR2018/005380, filed on May 10, 2018, which claims the benefit of earlier filing date and right of priority to Korean Application No. 10-2017-0121234, filed on Sep. 20, 2017, the contents of which are all hereby incorporated by reference herein in their entirety.

FIELD OF THE INVENTION

The present disclosure is related to an energy storage system in which uninterruptible power supply is available.

BACKGROUND OF THE INVENTION

The energy storage system stores produced power in each of connected systems including a power plant, a substation, and a power line etc., and uses power selectively and efficiently when power is needed, thereby enhancing energy efficiency.

In the energy storage system, if an overall load rate is improved by leveling an electric load, of which changes are large depending on a time zone and a season, the unit cost for generating power can be lowered, and the investment cost needed to increase power fertilities and the operating cost etc. can be reduced. Accordingly, the electric charges can be lowered and energy can be conserved.

This energy storage system is installed and utilized in a power system for generation, power transmission and/or distribution, and a consumer and is used as function of frequency regulation, a generator output stabilization by using new renewable energy, peak load shaving, load leveling, and an emergency power source etc.

Also, the energy storage system is largely divided into physical energy storage and chemical energy storage according to a storage method. The physical energy storage includes a method using pumping-up power generation, compressed air storage, and a flywheel etc., and the chemical energy storage includes a method using a lithium-ion battery, a lead storage battery, and a Nas battery etc.

Meanwhile, conventionally, when a problem occurs in a grid side converter (that is, a converter converting an AC voltage of a grid to a DC voltage and providing the DC voltage to a DC power distribution network) of the energy storage system, it is difficult not only to detect if there is an accident in the grid but also to control a voltage of the DC power distribution network.

Also, conventionally, all components of the energy storage system is controlled by a common higher layer controller, so that there is a problem in that it is difficult to separate some of components and use the components mixed with those of other companies' facilities.

BRIEF SUMMARY OF THE INVENTION

The present disclosure is for providing the energy storage system in which an emergency operation response is possible and compatibility with those of other companies' facilities is improved.

In order to achieve the above matter, the energy storage system of the present disclosure relates to an energy storage system for managing a grid and power of a direct current (DC) power distribution network associated with the grid, the energy storage system includes a first converter connected between a grid and a DC power distribution network so as to control a voltage of the DC power distribution network, a second converter connected to the DC power distribution network so as to detect a voltage of the DC power distribution network, a battery connected to the second converter, wherein the second converter controls charging/discharging of the battery, a rectifier connected in parallel to the first converter, and a first higher layer controller for controlling the first converter, the second converter, and the rectifier, and determining a limit voltage of the DC power distribution network and whether to drive the rectifier, based on a state of the first converter.

The limit voltage of the DC power distribution network includes a first limit voltage and a second limit voltage, of which a voltage level is higher than that of the first limit voltage.

The first higher layer controller, when a problem occurs in the first converter, stops a drive of the first converter, starts a drive of the rectifier, and decides the limit voltage of the DC power distribution network as the first limit voltage.

The first higher layer controller, when the problem of the first converter is solved, starts the drive of the first converter, stops the drive of the rectifier, and decides the limit voltage of the DC power distribution network as the second limit voltage.

When the first converter is broken down and the voltage of the DC power distribution network is lower than the second limit voltage, the second converter discharge the battery, the first higher layer controller determines if the gird is broken down and controls the second converter and the rectifier based on a determination result.

When the gird is broken down, the first higher layer controller produces a command about an operation mode of the second converter and provides the command to the second converter, and the second converter continues work discharging the battery based on the command provided from the first higher layer controller.

When a state of the grid is normal, the first higher layer controller produces a first command about an operation mode of the second converter and a second command about an operation mode of the rectifier, provides the first command to the second converter, and provides the second command to the rectifier, wherein the second converter stops work of discharging the battery based on the first command, and the rectifier rectifies a AC voltage provided from the grid to a DC voltage based on the second command and provides the DC voltage to the DC power distribution network.

When the first converter needs maintenance and repair work, the first higher layer controller stops a drive of the first converter and starts a drive of the rectifier.

When the rectifier is broken down and a voltage of the DC power distribution network is lower than the first limit voltage, the second converter discharges the battery, and the first higher layer controller determines if the grid is broken down and controls the first and second converters based on a determination result.

When the grid is broken down, the first higher layer controller produces a command about an operation mode of the second converter and provides the command to the second converter, the second converter continues work of discharging the battery based on the command provided from the first higher layer controller.

When a state of the grid is normal, the first higher layer controller produces a first command about an operation mode of the second converter and a second command about an operation mode of the first converter, provides the first command to the second converter, and provides the second command to the first converter, wherein the second converter stops work of discharging the battery based on the first command, and the first converter converts an AC voltage provided from the gird to a DC voltage based on the second command and provides the DC voltage to the DC power distribution network.

The second converter compares the voltage of the DC power distribution network with the limit voltage of the DC power distribution network and controls charging and/or discharging of the battery based on a comparison result.

The energy storage system further includes a third converter connected to the DC power distribution network, a first load which is connected to the third converter and in which a voltage is controlled by the third converter, and a second higher layer controller which controls the third converter.

The energy storage system further includes a fourth converter connected to the DC power distribution network, a second load which is connected to the fourth converter and in which a voltage is controlled by the fourth converter, a third higher layer controller which controls the fourth converter, a fifth converter connected to the DC power distribution network, a distribution power system which is controlled by the fifth converter and produces power to be provided to at least one of the first and second loads, the grid, and the battery, and a fourth higher layer controller, which controls the fifth converter and the distribution power system.

The first to fourth higher layer controllers share control information through communication with one another.

The first converter converts an AC voltage provided from the grid to a DC voltage and provides the DC voltage to the DC power distribution network, or converts a DC voltage provided from the DC power distribution network to a AC voltage and provides the AC voltage to the grid, the second converter converts a DC voltage provided from the DC power distribution network to a DC voltage and provides the DC voltage to the battery, or converts a DC voltage provided from the battery to a DC voltage and provides the DC voltage to the DC power distribution network, the third converter converts a DC voltage provided from the DC power distribution network to an AC voltage and provides the AC voltage to the first load, the fourth converter converts a DC voltage provided from the DC power distribution network to a DC voltage and provides the DC voltage to the second load, and the fifth converter converts an AC voltage provided from the distribution power system to a DC voltage and provides the DC voltage to the DC power distribution network.

According to the present disclosure as pre-described, a problem occurs in the grid side converter, the emergency operation response through the rectifier is possible and comparability with those of other companies' facilities can be improved by a structure in that each of components may be separated and controlled.

The specific matter of the present disclosure including the above matter will be described with exemplary embodiments for implementing the present disclosure.

BRIEF DESCRIPTION OF THE DRAWINGS

FIG. 1 is a schematic view for explaining an energy storage system according to an exemplary embodiment of the present disclosure.

FIGS. 2 to 4 are flowcharts for explaining a control flow of the energy storage system of FIG. 1.

FIG. 5 is a graph for explaining a charging method of a battery of FIG. 1.

FIGS. 6 to 8 are graphs for explaining a voltage change of a DC power distribution network according to a selective drive of a first converter and a rectifier of FIG. 1.

DETAILED DESCRIPTION OF THE INVENTION

The pre-described objectives, features and advantages will be described specifically hereinafter referring to the attached drawings; therefore those skilled in the art can easily realize the technical sprit of the present disclosure. In describing the disclosure, detailed description of known technologies in relation to the disclosure is omitted if it is deemed to make the gist of the present disclosure unnecessarily vague. Hereinafter, referring to the attached drawings, a preferred embodiment according to the present disclosure will be explained specifically. Throughout the drawings, identical reference numerals denote identical or similar components.

Hereinafter, referring to FIG. 1, the energy storage system according to an exemplary embodiment of the present disclosure will be explained.

FIG. 1 is a schematic view explaining the energy storage system according to an exemplary embodiment of the present disclosure.

In advance, referring to FIG. 1, the energy storage system according to an exemplary embodiment of the present disclosure is able to manage power of a grid 10 and a DC power distribution network 20 (that is, a DC grid) connected to the grid 10.

For reference, the grid 10 may include a power plant, a substation, and a power line etc. Also, the DC power distribution network 20 may include a region between a battery 180 and a second converter 150 despite of being not shown.

Specifically, the energy storage system according to an exemplary embodiment of the present disclosure may include a first converter 100, a rectifier 110, the second converter 150, the battery 180, a third converter 200, a first load 230, a fourth converter 250, a second load 280, a fifth converter 300, a distribution power system 330, an first higher layer controller 350, a second higher layer controller 360, a third higher layer controller 370, and a fourth higher layer controller 380.

For reference, the energy storage system may further include an additional load in addition to the first and second loads 230 and 280, or may include only one load of the first and second loads 230 and 280.

Meanwhile, for convenience of explanation, the case in that the energy storage system includes the first and second loads 230 and 280 in the present disclosure as an example.

The first converter 100 may be connected between the grid 10 and the DC power distribution network 20, convert an Alternating Current (AC) voltage of the grid 10 to a Direct Current (DC) voltage, and provide the DC voltage to the DC power distribution network 20. Surely, the first converter 100 may convert a DC voltage of the DC power distribution network 20 to an AC voltage and provide the AC voltage to the grid 10.

Accordingly, the first converter 100 may be an AC-DC converter.

Also, the first converter 100 may be driven in a DC voltage control mode so as to control a voltage of the DC power distribution network 20 when the grid 10 is in normal operation.

For reference, when an accident occurs in the grid 10 (that is, in case that the grid 10 is in power outage or is separated), a first converter 100 may turn off a gate signal and stop driving, thereby disconnecting the grid 10.

Surely, if power of the grid 10 is restored, the first converter 100 may start driving again.

Also, the first converter 100 may detect accident occurrence of the grid 10 and provide a detection result to the first higher layer controller 350.

Here, the first converter 100 may detect whether to occur an accident in the grid 10 and a type of the accident based on voltage and/or frequency errors and over-current errors etc. of the grid 10.

The second converter 150 may be connected to the DC power distribution network 20 and control charging and/or discharging of the battery 180.

Specifically, the second converter 150 may convert a DC voltage provided from the DC power distribution network 20 to a DC voltage and provide the DC voltage to the battery 180, or convert a DC voltage provided from the battery 180 to a DC voltage and provide the DC voltage to DC power distribution network 20.

Accordingly, the second converter 150 may be a DC-DC converter.

Here, the meaning of converting a DC voltage to a DC voltage may mean a DC voltage is raised or lowered to a DC voltage in a different level.

Also, the second converter 150, for example, if an accident occurs in the grid 10 or there is a problem in a voltage flow of the DC power distribution network 20, may be driven in an emergency operation mode, and if there is no accident in the grid 10 (that is, in case that the grid 10 is normally driven, so that there is no problem in a voltage flow of the DC power distribution network 20), the second converter 150 may be driven in a peak reduction mode.

Specifically, the second converter 150 may be driven in a power control mode so as to control power of the battery 180 when the grid 10 is in normal operation.

Particularly, the second converter 150 may be driven in a peak reduction mode among power control modes when the grid 10 is in normal operation.

Accordingly, the second converter 150 may determine charging and/or discharging of the battery 180 based on consumed power of the first and second loads 230 and 280 and supply power of the grid 10 and the distribution power system 330, and may charge or discharge the battery 180 within the range of the predetermined normal State of Charge (SOC) based on the determination.

That is, for example, the second converter 150 may perform peak reduction function in that the battery 180 is discharged within the range of the predetermined normal SOC at maximum load time (when power consumption amount of the load is maximum, and the battery 180 is charged within the range of the predetermined normal SOC at minimum load time (when power consumption amount of the load is minimum).

The specific content of a battery charging and/or discharging method of the second converter 150 will be described hereinafter.

For reference, the range of the normal SOC is the range set for preventing the battery 180 from being overly charged or discharged, so that the range may me changed flexibly by a user.

That is, the second convert 150 controls a voltage and a current of the battery 180 based on the above method, so that a SOC of the battery 180 may be managed and watched, and occurrence of voltage errors or over-current errors is prevented, thereby protecting the battery 180.

Also, the second converter 150 may detect a voltage of the DC power distribution network 20 at all times and may be in standby in order that a mode can be directly changed to an emergency operation mode if there is an accident in the grid 10.

For example, the second converter 150 may detect a voltage change rate (that is, a DC voltage change rate according to time) of the DC power distribution network 20, or may detect if a voltage of the DC power distribution network 20 is lowered to be not higher than the predetermined limit voltage of the DC power distribution network 20 at present.

Here, a limit voltage may be a reference voltage of UPS mode drive start. Therefore, if the voltage of the DC power distribution network 20 at present is higher than the limit voltage of the DC power distribution network 20, the second converter 150 may determine there is a marginal voltage in the DC power distribution network 20 and charge the battery 180.

Meanwhile, if an accident occurs in the grid 10, the first converter 100 stops driving, so that the second converter 150 may control a voltage of the DC power distribution network 20.

Specifically, the second converter 150, when an accident occurs in the grid 10, may receive a detection result of a grid accident from the first higher layer controller 350 or detect a voltage of the DC power distribution network 20, so that it may be confirmed if an accident occurs in the grid 10. Also, the second converter 150 may control a voltage of the DC power distribution network 20 based on the detection result of the grid accident.

Further, the second converter 150 may be driven in an emergency operation mode of power control modes if an accident occurs in the grid 10 or there is a problem in a power flow of the DC power distribution network 20.

The second converter 150, when driven in the emergency operation mode, may detect a SOC of the battery 180, and discharge the battery 180 based on the detected SOC of the battery 180 until the SOC is in a minimum state (hereinafter, described as the minimum SOC), so that power may be supplied to the first and second loads 230 and 280.

For reference, the second converter 150 may detect state information of the battery 180 and voltage information of the DC power distribution network 20 etc. and provide the information to the first higher layer controller 350.

The rectifier 110 may be connected in parallel to the first converter 100.

Specifically, the rectifier 110 is connected between the grid 10 and the DC power distribution network 20, and when a problem occurs in the first converter 100, the rectifier 110 may be driven by the first higher layer controller 350.

That is, if a problem occurs in the first converter 100, the first converter 100 may stop driving and the rectifier 110 may start driving.

On the contrary, if the first converter 100 is in a normal state, the first converter 100 may be normally driven and the rectifier may stop driving.

Here, the case in that a problem occurs in the first converter 100 may include, for example, the case in that the first converter 100 needs maintenance and repair (for example, maintenance and repair in a process of a regular inspection) and the case in that the first converter 100 is broken down.

Also, the rectifier 110 may rectify an AC voltage of the grid 10 to a DC voltage and provide the DC voltage to the DC power distribution network 20, and may include, for example, a Diode Rectifier, but is not limited thereto.

Further, when an accident occurs in the grid 10 (that is, in case that the grid 10 is in power outage or is separated), the rectifier 110 may detect accident occurrence of the grid 10 and provide a detection result to the first higher layer controller 350.

Here, the rectifier 110 may detect whether to occur an accident in the grid 10 and a type of the accident based on voltage and/or frequency errors and over-current errors etc. of the grid 10.

Also, the rectifier 110 is selectively driven with the first converter 100 by the first higher layer controller 350 wherein according to a selective drive, a voltage of the DC power distribution network 20 is changed. The specific content thereto will be described hereinafter.

The third converter 200 may be connected with the DC power distribution network 20 and control a voltage of the first load 230.

Specifically, the third converter 200 may convert a DC voltage provided from the DC power distribution network 20 to an AC voltage and provide the AC voltage to the first load 230. That is, the third converter 200 may control a power state of the load 230.

Accordingly, the third converter 200 may be a DC-AC converter, and the first load 230 may be an AC load.

Also, the third converter 200 may detect consumed power (that is, needed power) and a state (for example, voltage and frequency errors and over-current errors etc.) of the first load 230 and may provide the above to the second higher layer controller 360.

The fourth converter 250 may be connected with DC power distribution network 20 and control a voltage of the second load 280.

Specifically, the fourth converter 250 may convert a DC voltage provided from the DC power distribution network 20 to a DC voltage and provide the DC voltage to the second load 280. That is, the fourth converter 250 may control a power state of the second load 280.

Accordingly, the fourth converter 250 may be a DC-DC converter and the second load 280 may be a DC load.

Here, the meaning of converting a DC voltage to a DC voltage may mean that a DC voltage is raised or lowered to a DC voltage in a different level.

Also, the fourth converter 250 may detect consumed power (that is, needed power) and a state (for example, voltage and frequency errors and over-current errors etc.) of the second load 280 and may provide the above to the third higher layer controller 370.

The fifth converter 300 may be connected to the DC power distribution network 20 and may control the distribution power system 330.

Specifically, the fifth converter 300 may convert an AC voltage provided from the control distribution power system 330 to a DC voltage and provide the DC voltage to the DC power distribution network 20.

Accordingly, the fifth converter 300 may be an AC-DC converter and the distribution power system 330 may be a system producing and outputting AC power.

Surely, in spite of being not shown in drawings, if the distribution power system 330 is a system producing and outputting DC power, the fifth converter 300 may be a DC-DC converter.

Meanwhile, for convenience of explanation, the case that the fifth converter 300 is an AC-DC converter will be explained in an exemplary embodiment of the present disclosure as an example.

Also, the fifth converter 300 may detect output power (that is, produced power) and a state (for example, voltage and frequency errors and over-current errors etc.) of the distribution power system 330 and may provide the above to the fourth higher layer controller 380.

The battery 180 may be connected with the second converter 150 and charging and/or discharging thereof may be controlled by the second converter 150.

Also, the battery 180 may include at least one or more of battery cells, and each battery cell may include a plurality of bare cells.

The first load 230 may be connected to the third converter 200 wherein a voltage (that is, power) may be controlled by the third converter 200. Also, the first load 230 may be, for example, an AC load.

The second load 280 may be connected to the fourth converter 250 wherein a voltage (that is, power) may be controlled by the fourth converter 250. Also, the second load 280 may be, for example, a DC load.

The distribution power system 330 may be controlled by the fifth converter 300 and may produce power to be provided to at least one of the first and second loads 230 and 280, the grid 10, and the battery 180.

Specifically, the distribution power system 330 may produce power by using one or more of a fossil fuel, a nuclear power plant, and new renewable energy.

That is, the distribution power system 330 may be a new renewable energy generation system using new renewable energy, for example, such as a photovoltaic power generation system, a wind power generation system, and a tidal power generation system.

For reference, in case that the distribution power system 330 is a wind power generation system and produces AC power, the fifth converter 300 may be a AC-DC converter, and in case that the distribution power system 330 is a photovoltaic power generation system and produces DC power, the fifth converter 300 may be a DC-DC converter.

The first higher layer controller 350 may control the first and second converters 100 and 150 and the rectifier 110, and may determine whether to drive the rectifier 110 and a limit voltage of the DC power distribution network 20 based on a state of the first converter 100.

Under the premise in that the first converter 100 is driven and the rectifier 110 is in a drive stop state, the above is explained as follows.

Specifically, the first higher layer controller 350, if a problem occurs in the first converter 100, may stop a drive of the first converter 100, start a drive of the rectifier 110, and decide the limit voltage of the DC power distribution network 20 as the first limit voltage.

Surely, the first higher layer controller 350, if the problem of the first converter 100 is solved, may start (that is, restart) a drive of the first converter 100 and stop a drive of the rectifier 110, and may determine the limit voltage of the DC power distribution network 20 as the second limit voltage.

For reference, the first higher layer controller 350, if a state of the first converter 100 is normal, may maintain a drive of the first converter 100, maintain a drive stop state of the rectifier 110, and decide the limit voltage of the DC power distribution network 20 as the second limit voltage.

For reference, the first and second limit voltage values may be preset by the user, and the second limit voltage may have a voltage level that is higher than that of the first limit voltage.

Also, the first higher layer controller 350 may control and watch the first and second converters 100 and 150 and the rectifier 110, and may share control information through mutual communication with second to fourth higher layer controllers 360, 370, and 380.

Specifically, the first higher layer controller 350 may include, for example, a Programmable Logic Controller (PLC) or an Energy Management System (EMS) and may communicate with each of components (for example, not only first and second converters 100 and 150 and the rectifier 110 but also the grid 10 and battery 180 etc.), thereby determining an operation state at present.

For reference, the first higher layer controller 350 may receive, for example, SOC information of the battery 180, charging and/or discharging information of the battery 180, a voltage of the grid 10, current information, voltage information of the DC power distribution network 20 etc. from at least one of the first and second converters 100 and 150 and the rectifier 110.

Also, the first higher layer controller 350 may be realized by, for example, high-speed communication basis (for example, a Controller Area Network (CAN)) and may communicate with the first and second converters 100 and 150, the rectifier 110, the second to fourth higher layer controllers 360, 370 and 380 in a way of wire or wireless.

Further, the first higher layer controller 350 may control all of sequence operation of the energy storage system and give a command to each of components according to each of situations so as to perform operation.

Meanwhile, the first higher layer controller 350 may not perform function and a role (for example, an emergency operation mode (that is, UPS mode) of the second converter 150) overlapping with those of the second to fourth higher layer controllers 360, 370, and 380, the first and second converters 100 and 150, and the rectifier 110.

The second higher layer controller 360 may control the third converter 200.

Specifically, the second higher layer controller 360 may control and watch the third converter 200, and share control information through mutual communication with the first, third and fourth higher layer controllers 350, 370 and 380.

Specifically, the second higher layer controller 360 may include, for example, a Programmable Logic Controller (PLC) and may determine operation state at present by communicating with each of components (for example, a third converter 200 and a first load 230 etc.).

For reference, the second higher layer controller 360 may receive for example, consumed power information of the first load 230, state information (for example, voltage and frequency errors and over-current errors etc.) of the first load 230 etc. from the third converter 200.

Also, the second higher layer controller 360 may be realized by, for example, high-speed communication basis (for example, a Controller Area Network (CAN)) and the third converter 200 may communicate with the third converter 200, and the first, third and fourth higher layer controllers 350, 370, and 380 in a way of wire or wireless.

Further, the second higher layer controller 360 may control sequence operation of the third converter 200 and give a command to the third converter 200 so as to perform operation according to a situation.

Meanwhile, the second higher layer controller 360 may not perform function and a role overlapping with those of the third converter 200 in the present disclosure.

The third higher layer controller 370 may control the fourth converter 250.

Specifically, the third higher layer controller 370 may control and watch the fourth converter 250 and share control information through mutual communication with the first, second and fourth higher layer controllers 350, 360, and 380.

Specifically, the third higher layer controller 370 may include, for example, a Programmable Logic Controller (PLC) and determine an operation state at present by communicating with each of components (for example, the fourth converter 250 and the second load 280 etc.).

For reference, the third higher layer controller 370 may receive for example, consumed power information of the second load 280 and state information (for example, voltage and frequency errors and over-current errors etc.) of the second load 280 etc. from the fourth converter 250.

Also, the third higher layer controller 370 may be realized by, for example, high-speed communication basis (for example, a Controller Area Network (CAN)) and the fourth converter 250 may communicate with the first, second, and fourth converters 350, 360, and 380 in a way of wire or wireless.

Further, the third higher layer controller 370 may control sequence operation of the fourth converter 250 and give a command to the fourth converter 250 so as to perform operation according to a situation.

Meanwhile, the third higher layer controller 370 may not perform function and a role overlapping with those of the fourth converter 250 in the present disclosure.

The fourth higher layer controller 380 may control the fifth converter 300 and the distribution power system 330.

Specifically, the fourth higher layer controller 380 may control and watch the fourth converter 250 and the distribution power system 330 and may share control information through mutual communication with the first to third higher layer controllers 350, 360, and 370.

Specifically, the fourth higher layer controller 380 may include, for example, a Programmable Logic Controller (PLC) and may determine an operation state at present by communicating with each of components (for example, the fifth converter 300 and the distribution power system 330 etc.).

For reference, the fourth higher layer controller 380 may receive, for example, produced power information of the distribution power system 330 etc. from the fifth converter 300 or the distribution power system 330.

Also, the fourth higher layer controller 380 may be realized by, for example, high-speed communication basis (for example, Controller Area Network (CAN)) and the fifth converter 300 may communicate with the first to third higher layer controllers 350, 360, and 370 in a way of wire or wireless.

Further, the fourth higher layer controller 380 may control sequence operation of the fifth converter 300 and give a command to the fifth converter 300 so as to perform operation according to a situation.

Meanwhile, the fourth higher layer controller 380 may not perform function and a role overlapping with those of the fifth converter 300 in the present disclosure.

As a result, based on the above feature, a circuit and a component of the first to fourth higher layer controllers 350, 360, 370, and 380 may be simple, and complexity of communication connection is reduced, so that not only interference to a communication signal may be reduced but also chance in that an error occurs during operation may be also reduced. Consequently, performance and reliability of the energy storage system may be improved.

Also, each of components of the energy storage system is controlled by an individual higher layer controller, respectively, so that each of components may be separated and be used by mixing with those of other companies' facilities.

That is, for example, even though the first and second converters 150 and the rectifier 110 are manufactured by company A, the third converter 200 is manufactured by company B, the fourth converter 250 is manufactured by company C, and the fifth converter 300 is manufactured by company D, the above converters are able to be used by mixing with one another.

According to the present disclosure as pre-described, if there is a problem in the first converter 100, the emergency operation response by means of the rectifier 110 is possible. Further, based on a structure in that each of components is able to be separated and controlled, compatibility with those of other companies' facilities is able to be improved.

Hereinafter, referring to FIGS. 2 to 5, a control flow of the energy storage system of FIG. 1 will be explained.

FIGS. 2 to 4 are flowcharts for explaining a control flow of the energy storage system of FIG. 1. FIG. 5 is a graph for explaining a charging method of the battery of FIG. 1.

More specifically, a control flow of the first higher layer controller 350 and the second converter 150 of FIG. 1 is explained in FIGS. 2 to 4.

Referring to FIGS. 1 to 2, in advance, when the second converter 150 is in a state of standby, the first higher layer controller 350 detects if there is a problem in the first converter 100 (S100).

Specifically, the first higher layer controller 350 may receive state information of the first converter 100 from the first converter 100 and may detect if there is a problem in the first converter 100 based on the received state information of the first converter 100.

If there is a problem in the converter 100, the first higher layer controller 350 determines a limit voltage (Vdc_Limit) of the DC power distribution network 20 as the first limit voltage (VL1; for example, 570V) (S110).

Specifically, the first higher layer controller 350, if there is a problem in the first converter 100, may stop a drive of the first converter 100, start a drive of the rectifier 110, and determine the limit voltage (Vdc_Limit) of the DC power distribution network 20 as the first limit voltage (VL1; for example, 570V) based on an output voltage level (for example, 600V) of the rectifier 110.

On the contrary, if there is no problem in the first converter 100 (that is, if the first converter is normally driven), the first higher layer controller 350 determines the limit voltage (Vdc_Limit) of the DC power distribution network 20 as the second limit voltage (VL2; for example, 630V) (S120).

Specifically, the first higher layer controller 350, if the first converter 100 is normally driven, may maintain a drive state of the first converter 100, maintain a drive stop state of the rectifier 110, and determine the limit voltage (Vdc_Limit) of the DC power distribution network 20 as the second limit voltage (VL2; for example, 630 V) based on an output voltage level (for example, 700V) of the first converter 100.

For reference, an output voltage level of the first converter 100 may be higher than an output voltage level of the rectifier 110, so that the second limit voltage (VL2) may be higher than a first limit voltage (VL1).

If the limit voltage (Vdc_Limit) of the DC power distribution network 20 is determined, the second converter 150 compares the limit voltage (Vdc_Limit) of the DC power distribution network with a voltage (Vdc) of the DC power distribution network (S150).

Specifically, the first higher layer controller 350 may provide limit voltage information of the DC power distribution network to the second converter 150, and the second converter 150 may compare the limit voltage (Vdc_Limit) of the DC power distribution network provided from the first higher layer controller 350 with a voltage (Vdc; that is, a real-time voltage) of the DC power distribution network.

Also, the second converter 150 may control charging and/or discharging of the battery 180 based on a comparison result.

In advance, referring to FIGS. 1 to 3, if a voltage of the DC power distribution network 20 is lower than a limit voltage (Vdc_Limit) of the DC power distribution network, the second converter 150 determines if a SOC of the battery 220 is larger than the minimum SOC (SOC Min) (S200).

For reference, the reason in that a voltage (Vdc) of the DC power distribution network becomes lower than a limit voltage (Vdc_Limit) of the DC power distribution network may be that, for example, the first converter 100 or the rectifier 110 is broken down or there is a problem in the grid 10, so that power of the grid 10 is not properly provided to the DC power distribution network 20.

If the SOC of the battery 180 is larger than the minimum SOC (SOC Min), the second converter 150 performs a DC Grid Voltage Control (S220).

That is, the second converter 150 is driven in an emergency operation mode (that is, a UPS mode) and discharges the battery 180, so that the second converter 150 may supply uninterruptible power to the first and second loads 230 and 280

Here, the second converter 150 may give a command notifying of operating in an emergency operation mode to the first higher layer controller 350.

Meanwhile, time taken in that the command is transferred from the second converter 150 to the first higher layer controller 350 is longer than time taken in that the second converter 150 is operated in an emergency operation mode, so that the second converter 150 may be actively operated in advance before receiving the command about an operation mode from the first higher layer controller 350.

For reference, the second converter 150 may confirm if a drive stop command (CMD STOP) is received from the first higher layer controller 350 while performing a DC grid voltage control (S230).

That is, if a drive stop command (CMD STOP) is received from the first higher layer controller 350, the second converter 150 may stop driving (DC/DC Converter STOP) (S330).

On the contrary, in case that a drive stop command (CMD STOP) is not received from the first higher layer controller 350, the second converter 150 may determine if a total operation time (CNT++) is larger than second reaction unit time (Delay) (S250).

Specifically, the second converter 150, if the total operation time (CNT++) is smaller than the second reaction unit time (Delay), may return to S200 and repeat the previous steps.

For reference, a first reaction unit time means the time taken in that the second converter 150 detects a SOC of the battery 180 and performs a DC grid voltage control (that is, performs S200 and S220) based on a detection result, and the total operation time (CNT++) means the time accumulating the first reaction unit time. Also, the second reaction unit time (Delay) may mean the time (for example, D1 of FIG. 6 or D2 of FIG. 8 as referred to as "delay time (Delay)") taken in that the second converter 150 receives a command about an operation mode of the second converter 150 from the first higher layer controller 350.

Accordingly, the second converter 150, in case that the total operation time (CNT++) is larger than the second reaction unit time (Delay), determines if the command provided from the first higher layer controller 350 is a UPS mode drive command (CMD UPS) (S270).

Specifically, in case that the total operation time (CNT++) is larger than the second reaction unit time (Delay), the second converter 150 is in a state of receiving the command about the operation mode from the first higher layer controller 350, so that the second converter 150 may determine if the command provided from the first higher layer controller 350 is a UPS mode drive command (CMD UPS).

The second converter 150, in case that the command provided from the first higher layer controller 350 is the UPS mode drive command (CMD UPS), performs a DC GRID VOLTAGE CONTROL (S280).

Specifically, in case that the second converter 150 receives the UPS mode drive command (CMD UPS) from the first higher layer controller 350, the second converter 150 may maintain discharge work of the battery 180 through the DC GRID VOLTAGE CONTROL.

For reference, the second converter 150 may confirm if a drive stop command (CMD STOP) is received from the first higher layer controller 350 while performing the DC grid voltage control (S310).

That is, in case that a drive stop command (CMD STOP) is received from the first higher layer controller 350, the second converter 150 may stop driving (S330).

On the contrary, in case that a drive stop command (CMD STOP) is not received from the first higher layer controller 350, the second converter 150 may return to S270.

Based on the above process, the second converter 150 may perform discharge work of the battery 180, and in case that the SOC of the battery 180 is smaller than the minimum SOC (SOC Min) in S200 or the command provided from the first higher layer controller 350 is not the UPS mode drive command (CMD UPS) in S270, the converter 150 may be in a state of standby (S290).

For reference, the meaning in that a SOC of the battery 180 is smaller than the minimum SOC (SOC Min) means that the battery 180 is in a state that does not have enough power to be discharged.

Also, the second converter 150 may confirm if a drive stop command (CMD STOP) is received from the first higher layer controller 350 in a standby state (S300).

Accordingly, in case that a drive stop command (CMD STOP) is received from the first higher layer controller 350, the second converter 150 may stop driving (S330), but in case that a drive stop command (CMD STOP) is not received from the first higher layer controller 350, the second converter 150 may return to an initial start step (Start).

Following, referring to FIGS. 1, 4 and 5, in case that a voltage (Vdc) of the DC power distribution network is larger than the limit voltage (Vdc_Limit) of the DC power distribution network, the second converter 150 confirms if the command provided from the first higher layer controller 350 is a charging command (CMD Charge) (S400).

Specifically, the second converter 150, in case that the command provided from the first higher layer controller 350 is not a charging command (CMD Charge), may return to the initial start step (Start).

On the contrary, the second converter 150, in case that the command provided from the first higher layer controller 350 is a charging command (CMD Charge), may confirm if the relevant charging command (CMD Charge) is the command (CMD Normal And Charge) of charging in a normal mode (for example, a peak reduction mode) (S420).

Specifically, the second converter 150, in case that the command provided from the first higher layer controller 350 is not the command (CMD Normal And Charge) of charging in a normal mode, may confirm if the relevant command is the drive stop command (CMD STOP) (S450).

In case that the relevant command is the drive stop command (CMD STOP), the second converter 150 stops driving (S510), and in case that the relevant command is not the drive stop command (CMD STOP), the second converter 150 may be in a standby state (S460).

For reference, the second converter 150, in case of being in a standby state, may return to the initial start step (Start).

Meanwhile, the second converter 150, in case that the command provided from the first higher layer controller 350 is the command of charging in a normal mode (CMD Normal And Charge), determines a drive mode based on a SOC (that is, a voltage level of the battery 180) of the battery 180 (S400).

Specifically, in case that a voltage level of the battery 180 is an Over Voltage Limit (hereinafter referred to as "OVL"), the second converter 150 may confirm if the command provided from the first higher layer controller 350 is a drive stop command (CMD STOP) (S450).

In case that the relevant command is a drive stop command (CMD STOP), the second converter 150 may stop driving (S510), and in case that the relevant command is not a drive stop command (CMD STOP), the second converter 150 may be in a standby state (S460).

Also, in case that a voltage level of the battery 220 is in a second region (Region 2), that is, a voltage level of the battery 180 is lower than the Over Voltage Limit (OVL) and is higher than the maximum voltage level (Voltage max), the second converter 150 may confirm if the command provided from the first higher layer controller 350 is the drive stop command (CMD STOP) (S470).

In case that the relevant command is the drive stop command (CMD STOP), the second converter 150 stops driving (S510), and in case that the relevant command is not the drive stop command (CMD STOP), the second converter 150 charges the battery 180 in a "Constant Voltage mode (CV mode)" (S480).

Meanwhile, in case that a voltage level of the battery 220 is in a first region (Region 1), that is, a voltage level of the battery 180 is lower than a maximum voltage level (Voltage max) and is larger than an Under Voltage Limit (hereinafter referred to as "UVL"), the second converter 150 may confirm if the command provided from the first higher layer controller 350 is the drive stop command (CMD STOP) (S490).

In case that the relevant command is the drive stop command (CMD STOP), the second converter 150 stops driving (S510), and in case that the relevant command is not the drive stop command (CMD STOP), the second converter 150 charges the battery 180 in a "Constant Current mode (CC mode)" (S500).

Here, a voltage between the maximum voltage level (Voltage max) and the minimum voltage level (Voltage min) may include a Nominal Voltage, wherein the minimum voltage level (Voltage min) corresponds to the minimum SOC (SOC Min) that is a reference for determining whether to continue discharge work of the battery 180, and the UVL corresponds to the minimum voltage level needed for protecting the battery 180.

For reference, the second converter 150, when the charge work is completed by charging the battery 180 within the pre-described SOC range in a CV mode or CC mode, may return to the initial start step (Start).

Based on the pre-described control method, the second converter 150 controls charging and/or discharging of the battery 180 according to whether to drive the first converter 100 or the rectifier 110, so that charging and/or discharging efficiency of the battery 180 may be improved.

Hereinafter, referring to FIGS. 6 to 8, a voltage change of the DC power distribution network 20 according to a selective drive of the first converter 100 and the rectifier 110 of FIG. 1 will be explained.

FIGS. 6 to 8 are graphs for explaining a voltage change of the DC power distribution network according to a selective drive of the first converter and the rectifier of FIG. 1.

In advance, referring to FIGS. 1 to 6, when the first converter 100 is broken down, a voltage change of the DC power distribution network 20 is shown.

Specifically, in case that the first converter 100 is normally driven, the DC power distribution network 20 may receive a specific level voltage (VN; for example, 700V) through the first converter 100.

Meanwhile, in case that the first converter 100 is broken down, the first converter 100 may not properly provide power provided from the grid 10 to the DC power distribution network 20, so that a voltage (Vdc) of the DC power distribution network is reduced.

In case that the voltage (Vdc) of the DC power distribution network is reduced and is lower than the second limit voltage (VL2; for example, 630V), the second converter 150 may detect the above and discharge the battery 180.

Here, certain time (T1; for example, about 12 ms) may be taken until the second converter 150 starts battery discharge work wherein the certain time (T1) corresponds to section A.

The second converter 150 may increase the voltage (Vdc) of the DC power distribution network to a normal range voltage (for example, 650V) that is the second limit voltage (VL2) or more at section B by means of the battery discharge work (that is, the emergency operation mode) and then may maintain the voltage.

Here, the first higher layer controller 350 may determine if the grid 10 is broken down during specific time (D1; for example, about 8 s) and may control the second converter 150 and the rectifier 110 based on a determination result.

Specifically, in case that a state of the grid 10 is normal, the first higher layer controller 350 may produce a first command about an operation mode of the second converter 150 and a second command about an operation mode of the rectifier 110, and may provide the first command to the second converter 150 and provide the second command to the rectifier 110.

Accordingly, the second converter 150, as shown in FIG. 6, may stop work of discharging the battery 180 based on the first command, and the rectifier 110 may rectify an AC voltage provided from the grid 10 to a DC voltage based on the second command, and provide a specific level voltage (VR; for example, 600V) to the DC power distribution network 20 at section C.

On the contrary, in case that the grid 10 is broken down, despite of being not shown in FIG. 6, the first higher layer controller 350 may produce a command about an operation mode of the second converter 150 and provide the command to the second converter 150, and the second converter 150 may continue work of discharging the battery 180 based on the command provided from the first higher layer controller 350.

Following, referring to FIGS. 1 to 7, in case that maintenance and repair work is needed in the first converter 100, a voltage change of the DC power distribution network 20 is shown.

Specifically, in case that the first converter 100 is normally driven, the DC power distribution network 20 may receive a specific level voltage (VN; for example, 700V) through the first converter 100.

Meanwhile, in case that maintenance and repair work is needed in the first converter 100, the first higher layer controller 350 may stop a drive of the first converter 100 and start a drive of the rectifier 110.

Accordingly, as shown in FIG. 7, the rectifier 110 may rectify an AC voltage provided from the grid 10 to a DC voltage and provide a specific level voltage (VR; for example, 600V) to the DC power distribution network 20 at section D.

Lastly, referring to FIGS. 1 to 8, when the rectifier 110 is broken down, a voltage change of the DC power distribution network 20 is shown.

Specifically, in case that the rectifier 110 is normally driven, the DC power distribution network 20 may receive a specific level voltage (VR; for example, 600V) through the rectifier 110.

Meanwhile, in case that the rectifier 110 is broken down, the rectifier 110 may not properly provide power provided from the grid 10 to the DC power distribution network 20, so that a voltage (Vdc) of the DC power distribution network is reduced.

In case that the voltage (Vdc) of the DC power distribution network is reduced and becomes lower than the first limit voltage (VL1; for example, 580V), the second converter 150 may detect the above and discharge the battery 180.

Here, certain time (T2; for example, about 5 to 12 ms) may be taken until the second converter 150 starts battery discharge work wherein the certain time (T2) corresponds to section E.

The second converter 150 may increase a voltage (Vdc) of the DC power distribution network to a normal range voltage (VU; for example, 650V) that is the first limit voltage (VL1) or more at section F by means of battery discharge work (that is, an emergency operation mode) and may maintain the voltage.

Here, the first higher layer controller 350 may determine if the grid 10 is broken down during specific time (D2; for example, about 3 s) and may control the second converter 150 and the first converter 100 based on a determination result.

Specifically, in case that a state of the grid 10 is normal, the first higher layer controller 350 may produce a first command about an operation mode of the second converter 150 and a second command about an operation mode of the first converter 100, provide the first command to the second converter 150, and provide the second command to the first converter 100.

Accordingly, the second converter 150, as shown in FIG. 8, may stop work of discharging the battery 180 based on the first command, and the first converter 100 may convert an AC voltage provided from the grid 10 to a DC voltage based on the second command and provide a specific level voltage (VN; for example, 700V) to the DC power distribution network 20 at section G.

On the contrary, in case that the grid 10 is broken down, despite of being not shown in FIG. 8, the first higher layer controller 350 may produce a command about an operation mode of the second converter 150 and provide the command to the second converter 150, and the second converter 150 may continue work of discharging the battery 180 based on the command provided from the first higher layer controller 350.

According to the present disclosure as pre-described, the first converter 100, the second converter 150, and the rectifier 110 are properly connected and driven, so that the problem in that a voltage of the DC power distribution network 20 is deviated from a normal voltage range may be prevented.

Various substitutions, modifications, and changes may be made by one having ordinary skill in the art within the scope of the technical spirit of the disclosure. Therefore the present disclosure as pre-described is not limited to the embodiments and the drawings set forth herein.

The invention claimed is:

1. An energy storage system for managing a grid and power of a direct current (DC) power distribution network associated with the grid, the energy storage system comprising:
   a first converter connected between the grid and the DC power distribution network so as to control a voltage of the DC power distribution network;
   a second converter connected to the DC power distribution network so as to detect the voltage of the DC power distribution network;
   a battery connected to the second converter, wherein the second converter controls charging and/or discharging of the battery;
   a rectifier connected in parallel to the first converter; and
   a first higher layer controller for controlling the first and second converters, and the rectifier, deciding a limit voltage of the DC power distribution network, and determining whether to drive the rectifier based on a state of the first converter;
   wherein the limit voltage of the DC power distribution network comprises a first limit voltage and a second limit voltage, of which a voltage level is higher than that of the first limit voltage;
   wherein the first higher layer controller, when a problem occurs in the first converter, stops a drive of the first converter, starts a drive of the rectifier, and decides the limit voltage of the DC power distribution network as the first limit voltage; and
   wherein when the first converter is broken down and the voltage of the DC power distribution network is lower than the second limit voltage, the second converter discharges the battery, and the first higher layer controller determines if the gird is broken down and controls the second converter and the rectifier based on a determination result of the state of the first converter.

2. The energy storage system of claim 1, wherein the first higher layer controller,
   when the problem of the first converter is solved, starts the drive of the first converter, stops the drive of the rectifier, and decides the limit voltage of the DC power distribution network as the second limit voltage.

3. The energy storage system of claim 1, wherein when the grid is broken down,
   the first higher layer controller produces a command about an operation mode of the second converter and provides the command to the second converter, and
   the second converter continues work of discharging the battery based on the command provided from the first higher layer controller.

4. The energy storage system of claim 1, wherein when a state of the grid is normal,
   the first higher layer controller produces a first command about an operation mode of the second converter and produces a second command about an operation mode of the rectifier, provides the first command to the second converter, and provides the second command to the rectifier,
   the second converter stops work discharging the battery based on the first command, and
   the rectifier rectifies a AC voltage provided from the grid based on the second command to a DC voltage and provides the DC voltage to the DC power distribution network.

5. The energy storage system of claim 1, wherein when the first converter needs maintenance and repair work,
   the first higher layer controller stops a drive of the first converter and starts a drive of the rectifier.

6. The energy storage system of claim 1, wherein when the rectifier is broken down and the voltage of the DC power distribution network is lower than the first limit voltage,
   the second converter discharges the battery, and
   the first higher layer controller determines if the grid is broken down and controls the first and second converters based on a determination result.

7. The energy storage system of claim 6, wherein when the grid is broken down,
   the first higher layer controller produces a command about an operation mode of the second converter and provides the command to the second converter, and
   the second converter continues work of discharging the battery based on the command provided from the first higher layer controller.

8. The energy storage system of claim 6, wherein when a state of the grid is normal,
   the first higher layer controller produces a first command about an operation mode of the second converter and a second command about an operation mode of the first converter, provides the first command to the second converter, and provides the second command to the first converter,
   the second converter stops work of discharging the battery based on the first command, and
   the first converter converts a AC voltage provided from the grid based on the second command to a DC voltage and provides the DC voltage to the DC power distribution network.

9. The energy storage system of claim 1, wherein the second converter compares the voltage of the DC power distribution network with the limit voltage of the DC power distribution network and controls charging and/or discharging of the battery based on a comparison result.

10. The energy storage system of claim 1, further comprising:
    a third converter connected to the DC power distribution network;
    a first load which is connected to the third converter and in which a voltage is controlled by the third converter; and
    a second higher layer controller which controls the third converter.

11. The energy storage system of claim 10, further comprising:
    a fourth converter connected to the DC power distribution network;
    a second load which is connected to the fourth converter and in which a voltage is controlled by the fourth converter;

a third higher layer controller which controls the fourth converter;

a fifth converter connected to the DC power distribution network;

a distribution power system which is controlled by the fifth converter and produces power to be provided to at least one of the first load, the second load, the grid, and the battery; and a fourth higher layer controller which controls the fifth converter and the distribution power system.

12. The energy storage system of claim 11, wherein the first to fourth higher layer controllers share control information through communication with one another.

13. The energy storage system of claim 11, wherein the first converter converts an AC voltage provided from the grid to a DC voltage and provides the DC voltage to the DC power distribution network, or converts a DC voltage provided from the DC power distribution network to an AC voltage and provides the AC voltage to the grid, the second converter converts a DC voltage provided from the DC power distribution network to a DC voltage and provides the DC voltage to the battery, or converts a DC voltage provided from the battery to a DC voltage and provides the DC voltage to the DC power distribution network, the third converter converts a DC voltage provided from the DC power distribution network to an AC voltage and provides the AC voltage to the first load, the fourth converter converts a DC voltage provided from the DC power distribution network to a DC voltage and provides the DC voltage to the second load, and the fifth converter converts an AC voltage provided from the distribution power system to a DC voltage and provides the DC voltage to the DC power distribution network.

\* \* \* \* \*